United States Patent [19]

Aquino et al.

[11] Patent Number: 4,959,235
[45] Date of Patent: Sep. 25, 1990

[54] FILLED CRACKER MAKING PROCESS

[75] Inventors: Agostino Aquino, Paterson, N.J.; Karl U. Lang, Port Jarvis, N.Y.

[73] Assignee: Nabisco Brands, Inc., East Hanover, N.J.

[21] Appl. No.: 240,198

[22] Filed: Sep. 6, 1988

[51] Int. Cl.⁵ .............................................. A21D 8/06
[52] U.S. Cl. .................................... 426/281; 426/282; 426/283
[58] Field of Search ............... 426/281, 282, 283, 497; 99/450.7, 450.8, 644

[56] References Cited

U.S. PATENT DOCUMENTS

| | | | |
|---|---|---|---|
| 4,209,536 | 6/1980 | Dogliotti | 426/94 |
| 4,329,920 | 5/1982 | Rose et al. | 99/450.4 |
| 4,613,508 | 9/1986 | Shishido | 426/281 |

Primary Examiner—Marianne Cintins
Assistant Examiner—Evan Federman

[57] ABSTRACT

Baked goods and in particular hard biscuits and crackers which are hollow and which are adapted to contain a filling are inverted subsequent to baking so that the biscuit or cracker can have a filling inserted therein from the side of the biscuit or cracker that had been contacting the bottom of the oven. It is preferred to insert a filling by means of needle injection into hollow biscuits and crackers through the side that had been in contact with the bottom of the oven since the other side in many instances will contain a fanciful design. The baked hollow forms as they emerge from the oven are inverted by being flowed to a wheel containing longitudinal stepped sections which upon rotation deposit the baked hollow forms on a lower conveyor belt in an inverted form. The hollow baked and inverted forms are then moved to an indexing means which holds the hollow baked forms while they are pierced by a needle and filled with a desired filling.

9 Claims, 2 Drawing Sheets

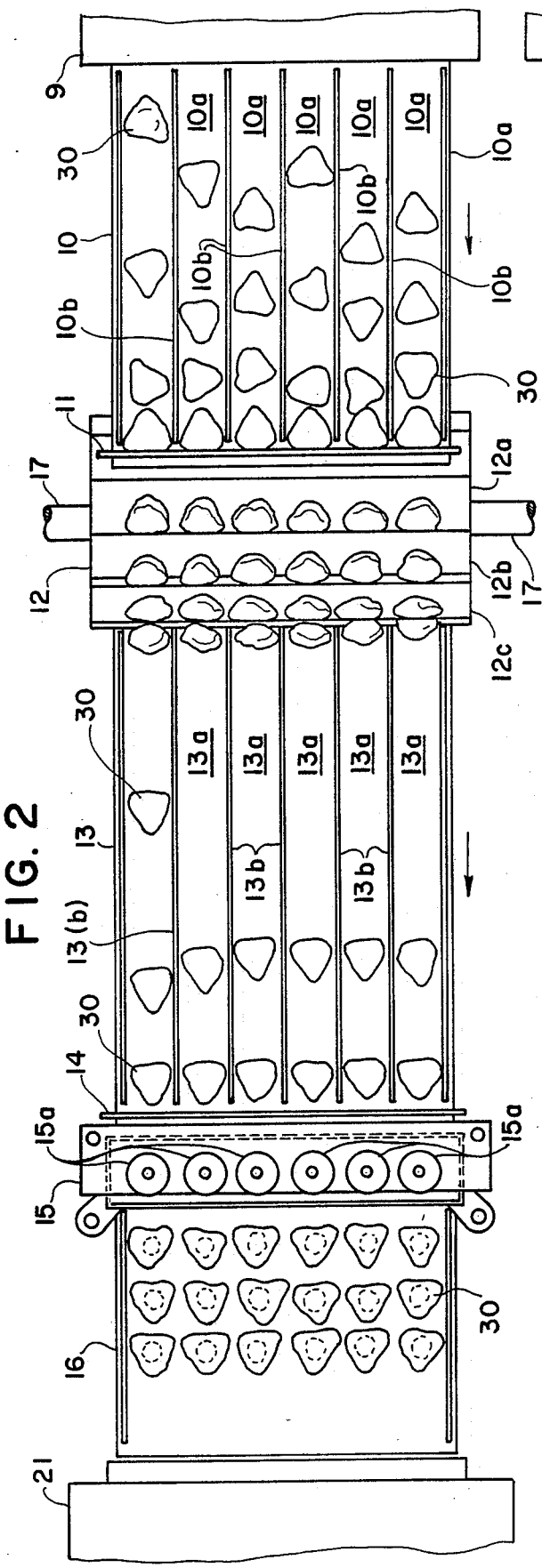
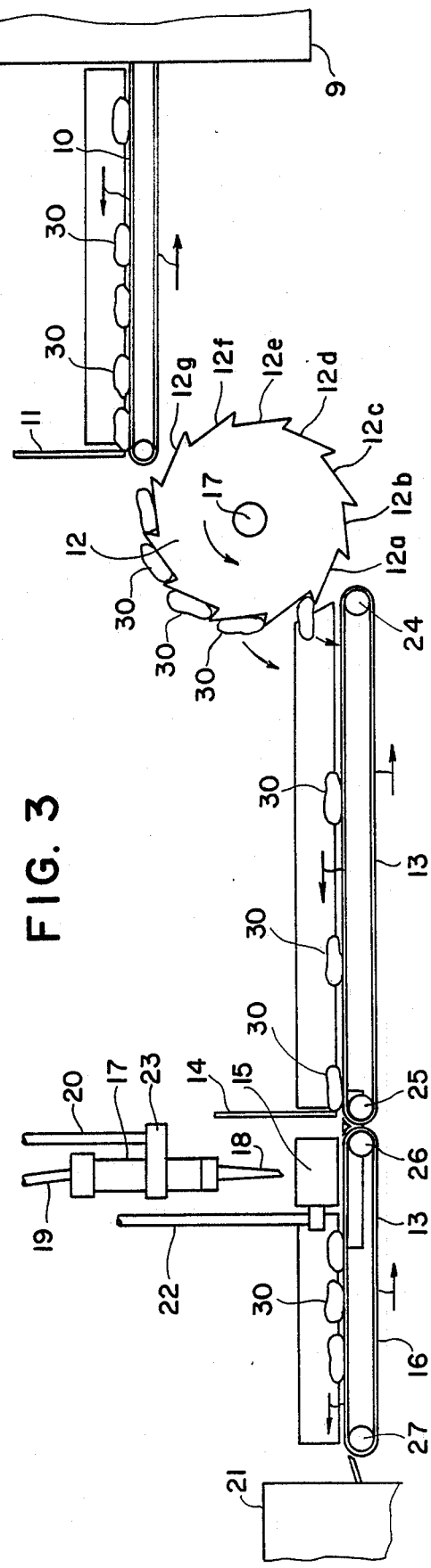
FIG. 2
FIG. 3

FILLED CRACKER MAKING PROCESS

BACKGROUND OF THE INVENTION

This invention relates to a method and apparatus for making a dough product including the inverting of the baked dough product prior to further processing. More particularly, this invention relates to the making of essentially hollow dough products with the inverting of the dough products prior to these products being filled.

The present process and apparatus is particularly adapted to producing baked goods whereby after the baking step the baked good needs to be inverted prior to further processing. One particular use for the present method and apparatus is in the production of filled biscuit and cracker products. These types of filled biscuit and cracker products consist of snack items that are produced in various forms and which have essentially hollow centers. The hollow centers are produced through the utilization of specific doughs, through the use of particular processing, or through a combination of these techniques. In U.S. Pat. No. 4,613,508 it is disclosed that hollow formed biscuit products can be formed which undergo a leavening increase of at least 280. There has also been developed a cracker dough which as a result of the dough composition and subsequent processing will undergo a high level of expansion during baking to thereby create a large internal hollow space. It is this hollow space that is created primarily by the leavening agent during the baking operation that is subsequently filled with a suitable filling utilizing needle injection techniques.

The filling of a hard biscuit or hard cracker using needle injection techniques consists of having a needle pierce the baked hollow form and after having pierced the form inserting therein the desired filling. Generally the filling step is conducted just subsequent to the baking step prior to any substantial cooling of the baked biscuit or cracker. At this point in the processing the biscuit or cracker retains more of its pliability and thus is not as susceptible to cracking as when the biscuit or cracker would be filled after it had been totally cooled. However, the biscuits and crackers can be filled after they have been cooled.

In the filling of these baked forms it is preferred to fill the baked forms from the side that had contacted the oven during the baking operation. One reason is that the opposite side of the baked form will in many instances contain a design which is imprinted onto the upper side of the baked form prior to baking. That is, the design is on the side opposite that which contacted the bottom of the oven during baking. In this way the pin hole that would be formed during the filling of the baked form would not be made in the side of the baked form having the fanciful design. This consequently requires a technique for inverting the baked shape forms immediately after the baking step and just prior to the step of needle injecting the filling into the baked form.

The above noted U.S. Pat. No. 4,613,508 discloses a method for producing hollow hard biscuit forms. These hollow baked forms will in many instances contain on one surface a fanciful design. Although these hollow baked forms can be filled from either side, it is preferred to fill the baked forms from the side not containing the design. This side will be the side that contacted the bottom of the oven during the baking of the hollow formed product. This patent does not address this issue and does not disclose from which side the hollow baked forms are filled, or from which side it would be preferred to fill the hollow baked forms. However, in the present processing it is clearly preferred to fill the hollow forms from what would be termed the bottom side in order not to disfigure the upper surface and any design which it carries.

BRIEF SUMMARY OF THE INVENTION

The present invention is directed to a method and apparatus for making a dough product and then inverting that dough product prior to subsequent processing of the baked dough product. The process steps consist of forming a dough, baking the dough to make a plurality of baked dough products, conveying the baked dough products to an inverter which consists of a wheel having a multiple number of longitudinal steps onto which the baked products can be fitted, rotating the wheel which carries the baked products, and depositing the baked products in an inverted mode on a lower table or conveyer belt mechanism. The inverted baked products are then passed for further processing.

In a preferred embodiment the baked dough products are hollow formed baked biscuits or crackers. After the baked biscuits or crackers come from the oven they are conveyed via a conveyor having separate channels to the inverting wheel mechanism. The units of the baked goods fall into place onto the steps of the rotating inverting wheel which upon rotation deposits them in an inverted state on a lower conveyor belt which transports the hollow formed biscuits or crackers to an indexing mold which will hold the biscuits or crackers during the step that needles are moved vertically downwardly to pierce the surface of the biscuit or cracker and to deposit a particular filling into the inside of each biscuit or cracker. After being filled the now filled biscuits or crackers are removed from the indexing mold and are conveyed to packaging.

The inverting apparatus consists primarily of a wheel having a multiple number of steps to hold the baked product while the wheel rotates and inverts the baked product. Also in combination with the wheel is a feed conveyor mechanism which channels the baked products into a series of channels so that they will be placed in an orderly manner on the steps of the rotating wheel. After leaving the rotating wheel in an inverted condition the inverted baked items are conveyed to a step of coating the items, inserting a filling into the items, or performing some other type of operation on the items. The step that would be performed after inverting, is not critical.

The apparatus can have essentially any number of lanes in the feed conveyor to the rotating inverter wheel and will have essentially the same number of lanes on the conveyor mechanism which flow the inverted baked products from the inverter wheel. The conveyor mechanism to the inverter wheel and the conveyor mechanism from the inverter wheel are designed for the orderly flow of items to and from the inverter wheel. Consequently any appropriate design can be used. The number of steps on the inverter wheel will depend on the diameter of the inverting wheel and the size of the cookie or cracker to be inverted.

BRIEF DESCRIPTION OF THE DRAWINGS

FIG. 2 is a top plan view of the apparatus for making and filling hollow baked form bakery products.

FIG. 3 is a side elevational view of the inverter wheel that is utilized to invert the baked bakery products.

DETAILED DESCRIPTION OF THE INVENTION

Figure 1:
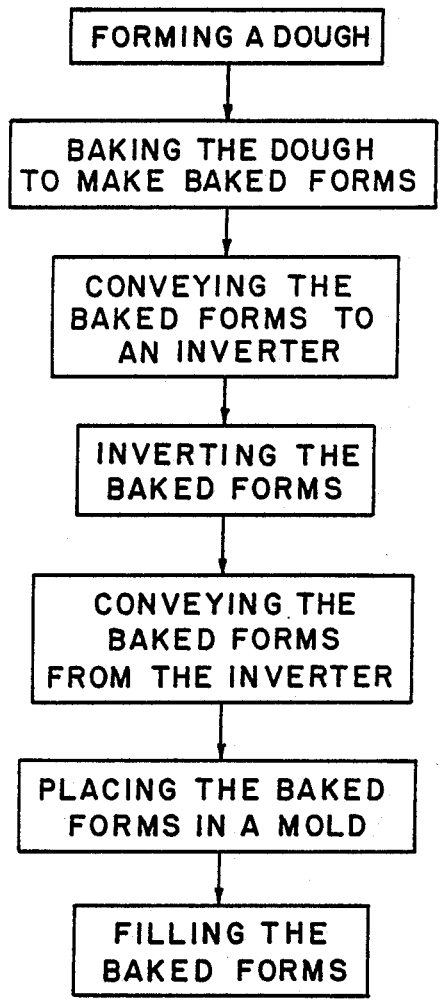
FIG. 1 is a schematic stepwise layout of the process for making and filling a hollow baked type of bakery product.

One technique for introducing a filling into a hollow baked product is to introduce that filling into the intended hollow space utilizing needle injection. In needle injection a fine needle pierces the surface skin of a hollow biscuit or cracker, and via a pressure on a filling material, deposits this filling material into the inside of the hollow biscuit or cracker. It is notable in this technique that the filling is inserted into the baked product which has a hard exterior surface subsequent to the baking step. In order to effectively insert the filling into the baked forms at this point the exterior surface of the baked form must be sufficiently strong in order to withstand the piercing of the surface by a needle. This thus requires products which are formed from fairly specific dough formulations. This has already been discussed above in some detail. Dough formulations suitable for forming hollow biscuits are set forth in U.S. Pat. No. 4,613,508. Other dough formulations which are suitable for forming a hard cracker that can withstand the penetration of a needle are known in the art.

Although the preferred embodiment in practicing the present invention is with regard to hollow biscuits and hollow crackers the process can be utilized with essentially any baked good. However, the preferred method is to make and to fill baked hollow forms of biscuits and crackers. The first step in any process consists of forming a suitable dough. This can be a dough formed in accordance with the process of U.S. Pat. No. 4,613,508 or that which is described in the example of this present application for patent. After the step of combining and mixing all of the ingredients forming the dough, which includes the forming of the dough into particular forms and shapes, such as the designs of animals, plants, or various articles, they are conveyed to a baking oven. However, prior to being baked the dough can also have a fanciful design embossed on one side. In the baking oven the forms are simultaneously baked and expanded. The doughs contain at least one leavening agent which during baking releases carbon dioxide which significantly expands the dough forms and aids in forming the hollow interior space. The temperature of the oven ranges from about 300° F. to about 700° F. The baking time will usually range from about 1 minute to about 15 minutes. This will depend on oven temperature and other factors. The baking temperature and baking times are interrelated. After baking, the baked forms leave the oven and are conveyed into a plurality of channels. In the plurality of channels the baked forms are moved along to an inverting wheel. The inverting wheel consists of a series of longitudinal stepped sections that are adapted to hold a plurality of the baked forms in each step area. Upon the rotation of the wheel the baked forms in each stepped section will be transferred to a lower conveyor belt in an inverted form. This lower conveyor belt will have a plurality of channels which direct the baked forms into an indexing mold. When each opening of the indexing mold has been filled with the baked forms a series of injecting needles extend downwardly to pierce each of the baked forms and to insert a filling into each of the baked forms. The now filled baked forms are removed from the indexing, mold and are conveyed to packaging.

FIG. 2 sets forth an overall plan view of the present apparatus. The various expanded forms that are to be baked are conveyed into or placed into baking oven 9. In oven 9 the particular forms are baked and will expand during the baking process. Depending on the speed of the oven conveyor mechanism the time in the oven will range from about 1 minute to about 15 minutes. The hot baked and expanded forms 30 leave oven 9 and enter onto conveyor 10 which consists of a plurality channels 10a. The channels 10a are separated by barriers 10b. The function of the channels 10a are to align the baked forms into lines 30 so that they can be deposited in a reasonable order onto inverter wheel 12. Optionally just prior to inverter wheel 12 there can be a gate 11 which can be operated via a timer or via photoelectric mechanism to hold the shaped forms until there is a shaped form in each channel to be deposited onto the inverter wheel. The baked forms that are placed on the inverter wheel remain on the inverter wheel until they are deposited by gravity onto conveyor 13 in an inverted form. The steps of inverter wheel 12 are designated in this FIGURE. as 12a, 12b, 12c, 12d, 12e, 12f, 12g and so on. The number of step sections on inverter wheel 12 will depend on the circumference of the wheel and the size of the baked good to be inverted. The inverter wheel is rotated on axle 17 by means of an electric motor. The speed of the inverter wheel 12 can be controlled using a common rheostat. The baked and inverted items are deposited onto conveyor belt 13 in one of the conveyor channels 13a. These channels 13a are separated one from the other by means of barriers 13b. The conveyor 13 moves the now inverted baked forms 30 along to gate 14. Gate 14 lines up a plurality of the inverted baked forms 30 that are to be filled. This gate 14 will stay closed until there is a baked form abutting the gate in each of the lanes 13a. At this point in time the gate 14 is opened and an inverted baked form is deposited into each of the openings 15a in indexing mold 15. When each of the mold openings 15a is filled with a baked form, a series of needles 18 project downwardly to pierce the surface of the biscuit or cracker and to inject a filling into each of the biscuits or crackers. After the biscuits or crackers have been filled they are removed from the indexing mold 15 and conveyed by means of conveyor 16 to final packaging.

The mold 15 is of a design where it has a series of openings, each adjacent to one of the channels 13a. Therefore when gate 14 opens a baked form 30 will move into a mold opening 15(a) by means of conveyors 13 and 16. The baked form will be held in the mold 15 until the forms are filled.

The inverter wheel 12 is shown in more detail in FIG. 3. This wheel rotates on axle 17 and consists of a plurality of stepped sections which are designated 12a, 12b, 12c, 12d, 12e, 12f, 12g and so on. As noted above the size of each of these stepped areas will depend on the size of the item that is to be inverted. The number will depend on the circumference of the inverter wheel. The speed at which this wheel is rotated will depend to a large degree on the speed of the other operations under which the baked product must go. For instance, in the process of filling hollow biscuits and crackers the rate determining step is the step of piercing the biscuit or cracker with the needle and injecting the filling into the hollow form product. The production of other products will have other rate controlling steps. However, it will be rare that the rate controlling step will be the step of inverting the baked product. This step can be conducted quite rapidly.

In making the present hollow biscuits and crackers the conveyor belt 16 is operated at a speed so as to provide a spacing between the biscuits or crackers as they exit the inverter wheel. It is desired to operate conveyor 13 at a higher speed so that the biscuits or crackers will not bunch up on conveyor 13.

Conveyor 13 is carried by tensioning rollers 24 and 25. These rollers both tension and rotate belt 13. Conveyor 16 is carried by rollers 26 and 27. These rollers both tension and rotate belt 16.

The injection apparatus consists of a plurality of needles 18 which are fed with an injection filling material from chamber 17. Chamber 17 receives the filling material from a supply through tubing 19. In the operation of the needle injection system the needle injector assembly will move upwardly and downwardly via shaft 20 which is connected to chamber 17 by clamp 23. When there is a biscuit or cracker in each of the mold openings 15a of mold 15 the needle injection system moves downwardly and injects a filling into each biscuit or cracker. The shaft 20 then retracts the needle injection system upwardly. The mold 15 will then also move upwardly and release the filled biscuits and crackers to move along conveyor 16 to packaging at 21. The mold 15 is raised and lowered by means of shaft 22. There is a coordination of the gate 14, the raising and lowering of mold 15 and the raising and lowering of the needle injectors 18.

The inverting wheel can be made out of metal or out of various plastic materials. However, for durability and for ease of cleaning it is preferred that this wheel be constructed out of metal such as aluminum or stainless steel.

Figure 4:
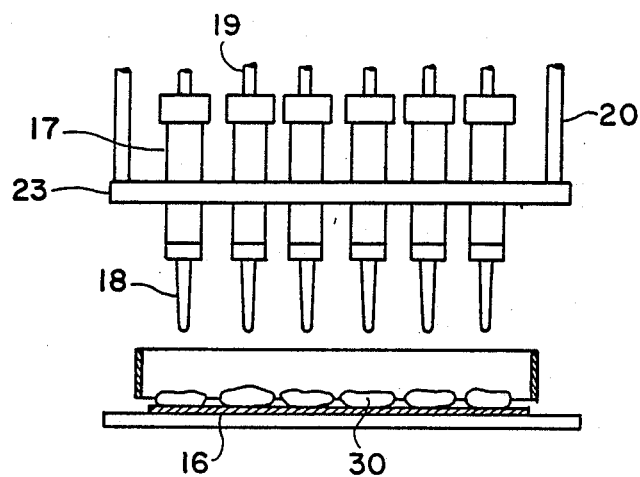
FIG. 4 is a side elevational view of the indexing means along with the needles for inserting fillings into the baked bakery products of FIG. 3.

FIG. 4 shows the indexing mold 15 and each of the openings 15a holding a cracker or biscuit for filling. Also shown is a series of needles 18 which are adapted to move downwardly to penetrate the biscuits or crackers and to inject the filling into the biscuit or cracker. After the biscuits or crackers have been filled they move along conveyor 16 to the point of packaging at 21. Conveyor 16 can be continuously moving as its operation can be coordinated with the needle injection filling mechanism.

As has been noted this baking technique and in particular this inverting wheel mechanism is specifically adapted to the filling of hollow biscuits and crackers. The fillings that can be inserted into these hollow biscuits and crackers vary over a wide range. These can be fat and or sugar based fillings and include chocolate fillings, peanut butter fillings, fruit fillings, vegetable fillings, meat based fillings, cheese fillings, seafood based fillings, and essentially any substance that can be formed into a puree and injected through a needle mechanism. The injection can be conducted while the injecting material is at room temperature or an elevated temperature. An elevated temperature is used in many instances in order to decrease the viscosity of the filling material.

While this inverting wheel has been specifically described with regard to filling hollow crackers or biscuits it can be used in any operation where a food product or essentially any other item needs to be inverted. What is required is an upper conveyor to convey the food product or other item to the inverting wheel, a stepped inverting wheel, and a lower conveyor to receive the food product or other item in an inverted manner. Once inverted essentially any operation can be performed on the food product or other item. Besides providing a method of making hollow filled crackers and biscuits it provides a unique technique for inverting items.

EXAMPLE

This example sets out a method of making and filling a hollow cracker using inverting wheel 12 to invert the hollow crackers. Based on 100 pounds of wheat flour, the ingredients are as follows:

| | |
|---|---|
| Shortening | 8.5 pounds |
| Emulsifier | 0.375 pounds |
| Barley Flour | 0.0875 pounds |
| Granulated Sugar | 6 pounds |
| Salt | 0.75 pounds |
| Sodium Bicarbonate | 0.75 pounds |
| Calcium Acid Phosphate | 0.625 pounds |
| Proteolytic Enzymes | 0.19 pounds |
| Water | 32 pounds |

The shortening, emulsifier, granulated sugar, salt, calcium acid phosphate and water are added to a dough mixer and mixed until fully blended. The mixture of wheat flour, barley flour, sodium bicarbonate is then added to this mixture followed by the addition of the proteolytic enzymes dispersed in a small amount of water. This is mixed for about 8 minutes. After mixing, the dough is proofed for about 3 hours. Following this proofing the dough is mixed for 1 minute and proofed again for 1 hour. The dough is now machined so that it can be cut into the desired shapes.

Machining consists of rolling the dough and folding the dough over onto itself to form a multilayered laminate of the dough. The dough is then sheeted to the correct thickness and cut into the desired shapes. The shapes are then fed to the oven where they are baked at 410° F. to form a hollow cracker 30. The baked crackers 30 are then conveyed from the oven on conveyor 10 and fed to inverter wheel 12. Upon the opening of gate 11 a series of hollow crackers are placed on a step of the inverter wheel. Upon the rotation of wheel 12 the hollow crackers drop onto conveyor 13 in an inverted state. The inverted crackers 30 move along conveyor 13 to gate 14. Gate 14 opens when there is a cracker in each lane and permits a cracker to fall into each mold opening 15(a). Each cracker is then injected with a filling and is then conveyed by means of conveyor 16 to packaging at 21.

What is claimed is:
1. A method producing filled hard biscuit products comprising
 (a) baking a plurality of pieces of a dough adapted to expand during baking to yield a plurality of baking forms having an essentially hollow center;
 (b) conveying said plurality of baked forms to a device to invert said baked forms;
 (c) aligning said plurality of baked forms into lines and conveying said baked forms in a plurality of channels to an indexing mold;
 (d) simultaneously inverting each line of said baked forms;
 (e) piercing an upper portion of each of said inverted baked forms with a needle to fill said inverted baked forms with a filling, and

(f) filling each of said inverted baked forms.

2. A method as in claim 1 wherein said pieces of dough are continuously baked.

3. A method as in claim 1 wherein said baked forms are conveyed into a plurality of channels which lead to a rotating wheel for inverting said baked forms.

4. A method as in claim 1 wherein said baked forms are inverted by being placed on a rotating wheel which receives said baked forms in a right side up configuration and as it rotates deposits said baked forms on a lower receiving means in an upside down configuration.

5. A method as in claim 3 wherein said baked forms are conveyed to a gate which remains closed until one baked form has reached said gate in each channel and then said baked forms are deposited on said rotating wheel.

6. A method as in claim 1 wherein said baked forms are continuously inverted.

7. A method as in claim 1 wherein said inverted baked forms are conveyed in a plurality of channels to a gate which regulates the flow of inverted baked forms into openings into said indexing mold.

8. A method as in claim 1 wherein the filled inverted baked forms are filled biscuits.

9. A method as in claim 1 wherein the filled inverted baked forms are filled crackers.

* * * * *

Disclaimer 4,959,235—*Agostino Aqunio*, Paterson, N.J.; *Karl U. Lang*, Port Javis, N.Y. FILLED CRACKER MAKING PROCESS. Patent dated Sept. 25, 1990. Disclaimer filed June 12, 1991, by the assignee, Nabisco Brands, Inc.

Hereby enters this disclaimer to claims 1, 2, and 6-9 of said patent.
[ *Official Gazette August 27, 1991* ]